(12) United States Patent
Bladow et al.

(10) Patent No.: US 6,910,721 B2
(45) Date of Patent: Jun. 28, 2005

(54) ELONGATED BUMPER BAR WITH SECTIONS TWISTED ROTATIONALLY ABOUT THE AXIS OF ELONGATION

(75) Inventors: Jeff Bladow, West Bloomfield, MI (US); Walter Jaeger, Lake Angelus, MI (US); Jereme Fleeger, Wayne, MI (US)

(73) Assignee: Pullman Industries, Inc., Troy, MI (US)

( * ) Notice: Subject to any disclaimer, the term of this patent is extended or adjusted under 35 U.S.C. 154(b) by 0 days.

(21) Appl. No.: 10/745,194

(22) Filed: Dec. 22, 2003

(65) Prior Publication Data

US 2004/0169380 A1 Sep. 2, 2004

Related U.S. Application Data

(60) Provisional application No. 60/435,410, filed on Dec. 20, 2002.

(51) Int. Cl.$^7$ ............................................... B60R 19/02
(52) U.S. Cl. ........................ 293/102; 293/120; 293/121
(58) Field of Search ................................. 293/102, 120, 293/121

(56) References Cited

U.S. PATENT DOCUMENTS

| | | | |
|---|---|---|---|
| 1,395,908 A | 11/1921 | Cox | |
| 1,433,201 A | 10/1922 | Grant | |
| 5,080,410 A | 1/1992 | Stewart et al. | 293/102 |
| 5,306,058 A | 4/1994 | Sturrus et al. | 293/154 |
| 5,462,144 A | 10/1995 | Guardiola et al. | 188/377 |
| 5,462,325 A | 10/1995 | Masuda et al. | 293/102 |
| 5,603,541 A | 2/1997 | Wada et al. | 293/102 |
| 5,722,708 A | 3/1998 | Jonsson | 293/102 |
| 6,325,431 B1 | 12/2001 | Ito | 293/102 |
| 6,343,820 B1 | 2/2002 | Pedersen | 293/102 |
| 6,349,521 B1 | 2/2002 | McKeon et al. | 52/735.1 |
| 6,352,297 B1 | 3/2002 | Sundgren et al. | 296/102 |
| 6,443,512 B1 | 9/2002 | Van Rees et al. | 293/132 |
| 6,575,510 B2 | 6/2003 | Weissenborn | 293/121 |
| 6,814,380 B2 * | 11/2004 | Yoshida et al. | 293/120 |
| 2003/0173787 A1 | 9/2003 | Zipfel | 293/102 |

\* cited by examiner

*Primary Examiner*—Lori L. Coletta
(74) *Attorney, Agent, or Firm*—Gifford, Krass, Groh, Sprinkle, Anderson, & Citkowski, P.C.

(57) ABSTRACT

A bumper system for an automotive vehicle includes a rolled steel tube having a box or C-shaped cross section fixed to the forward ends of the side rails of the vehicle so as to extend transversely to the vehicle's longitudinal axis. The forward surface of the vehicle is formed by a plastic fascia which may have sloped surfaces for styling or aerodynamic reasons. The space between the forward end of the bumper bar and the fascia is filled with foam intended to absorb energy in an impact. To better match the sloped sections of the fascia, certain sections of the bumper bar are twisted about the longitudinal axis of the bar to create surfaces inclined relative to the vertical. The bars are formed by roll forming a steel web into an elongated member having generally vertical opposed faces. A section of the rolled member is heated above a metallurgical transition temperature. Then sections to be inclined are twisted about the longitudinal axis of the bumper bar in a die forming station and are then quenched to form a hardened steel member.

6 Claims, 5 Drawing Sheets

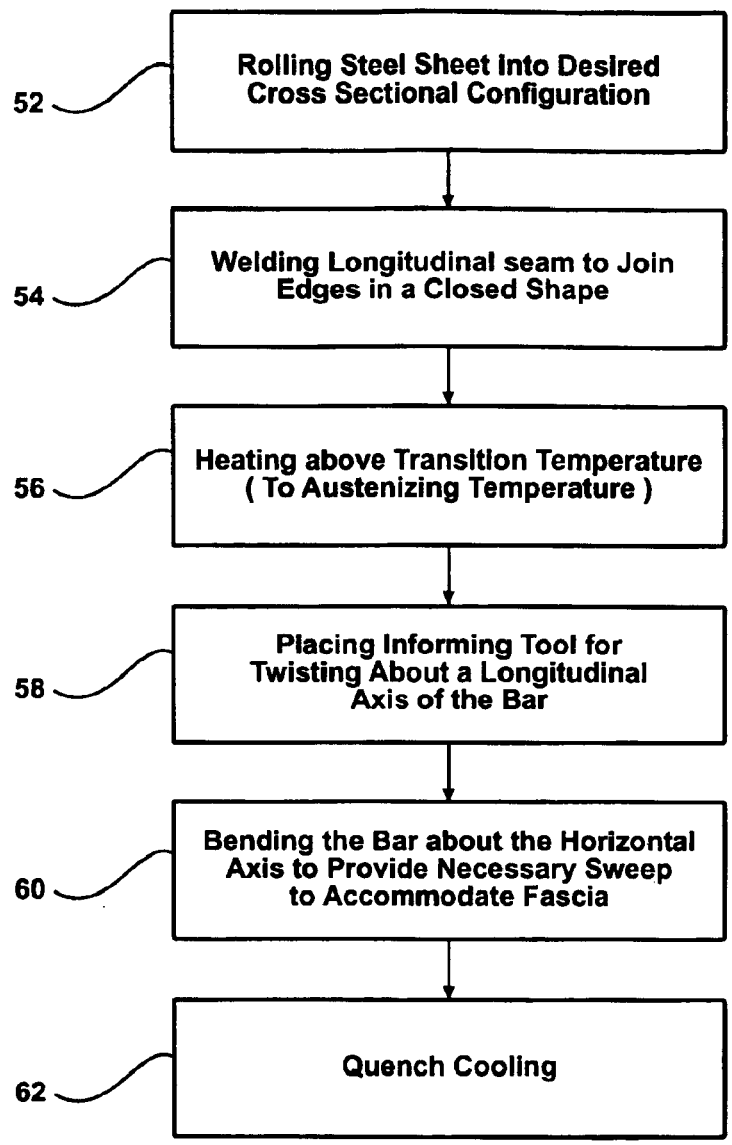
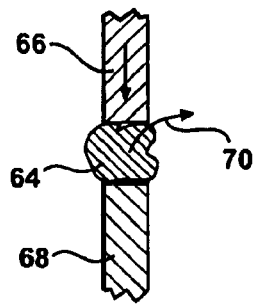

ELONGATED BUMPER BAR WITH SECTIONS TWISTED ROTATIONALLY ABOUT THE AXIS OF ELONGATION

RELATED APPLICATION

This application claims priority of U.S. Provisional Patent Application Ser. No. 60/435,410 filed Dec. 20, 2002, which is incorporated herein by reference.

BACKGROUND OF THE INVENTION

I. Field of the Invention

This invention relates to bumper systems for vehicles and more particularly to a unique bumper bar and method for making the same for use in a bumper system including an exterior fascia having inclined sections, a bumper bar secured to extending frame sections of the vehicle, and plastic foam between the bumper bar and the fascia.

II. Description of the Prior Art

Modern automotive vehicles typically employ bumper systems which include a bumper bar secured to the frame of the vehicle at either the forward or rear end, so as to extend transversely to the center line of the vehicle. The outer face of the bar is covered with a plastic fascia that is designed based on primarily aesthetic and aerodynamic considerations. The fascia may have surfaces inclined relative to the vertical, typically sloping downward and forward. Some or all of the space between the facing surfaces of the bumper bar and fascia may be filled with material such as a foam that absorbs energy between the two.

The system is intended to absorb as much impact energy as possible in the shortest distance possible for purposes of keeping the package size of the bumper at a minimum. Additionally, the mass of the system should be minimized to minimize the energy required to drive the vehicle and thus the vehicle emissions.

In order to achieve these criteria, the distance between the opposed surfaces of the bumper bar and the fascia should be minimized. However, the goal of employing a bumper bar with a conventional boxlike configuration with opposed vertical sidewalls, one connected to the frame and the other to the fascia, and with fascias employing non-vertical surfaces, is difficult to attain. This compromises the design goal of maintaining the bumper bar edge as close as possible to the vehicle exterior surface in order to meet, distribute and dissipate the energy that is absorbed during the collision.

SUMMARY OF THE PRESENT INVENTION

To improve this situation, the present invention contemplates a box-shaped or C-shaped bumper bar, made by a conventional rolling process, which has certain of its sections twisted about the longitudinal axis of the bar so that the forward faces of the bar at these twisted sections are inclined relative to the vertical to more closely match the mating surfaces of fascias with inclined surfaces. These twists may be made at the center section of the bumper bar, at the ends or other sections. A bumper system employing this novel bumper bar will have a smaller dimension along the longitudinal axis of the vehicle, give improved impact performance, and minimize weight relative to a conventional bumper design.

The bumper bars of the present invention may be manufactured by a variety of processes, but the present invention further relates to an improved method of manufacture of such bars. The method involves roll forming the bar in a conventional manner to achieve a box-shaped or C-shaped frame, welding the longitudinal seam to join the edges in a closed shape, if necessary and desired, heating the bar above the transition temperature, preferably to its austenizing temperature, and placing it in a forming tool which twists the selected sections about the longitudinal axis of the bar and bends the bar about the horizontal axis to provide it with the necessary sweep to accommodate the fascia which often has the rearward sweep away from the center. After the shaping, and preferably while in the same forming tool, the bumper beam is quenched.

The bumper bar of the present invention provides enhanced energy absorption performance because energy of impact is absorbed both in translation and in twisting of the inclined beam surfaces back toward the vertical.

Other objects, advantages and applications of the present invention will be made apparent by the following detailed description of a preferred embodiment of the invention. The description makes reference to the accompanying drawings.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is a schematic diagram illustrating the method of processing the rolled bumper bar of the present invention; and FIG. 7 is a cross section of the die forming part of FIG. 6 showing the manner of twisting the bar at the center section.

DETAILED DESCRIPTION OF A PREFERRED EMBODIMENT OF THE INVENTION

Figure 1:
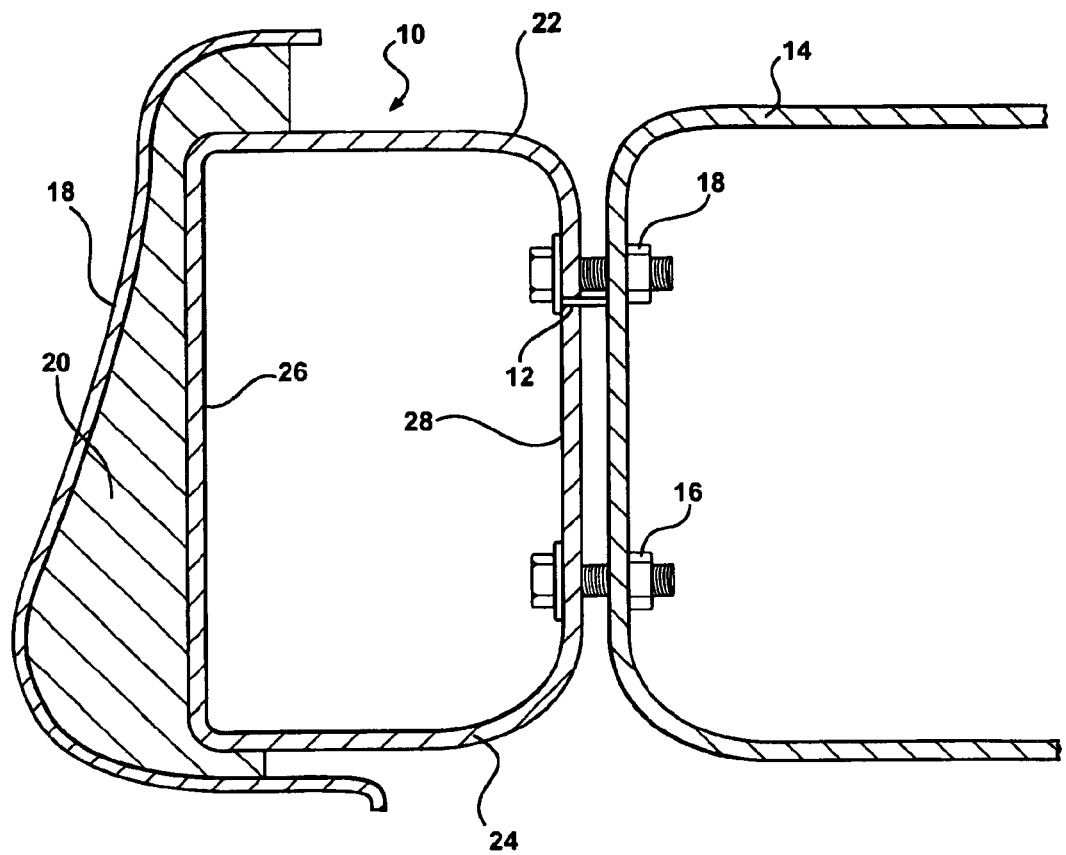
FIG. 1 is a cross section through a conventional bumper system showing a bumper bar, attached to the forward end of the vehicle frame, and a fascia covering the forward end of the bumper bar with foam plastic between the interior surface of the fascia and the forward surface of the bumper bar.

The present invention is directed toward a bumper bar system of the general type commonly used in automobiles and light trucks and illustrated in FIG. 1. These systems employ a bumper bar 10 which is usually produced by rolling sheet steel to form a generally box-like configuration which is elongated in the direction normal to the plane of the drawing. The box may be completely closed, as illustrated in FIG. 1, which is usually achieved by securing the free edges of the box as at 12 by welding, seaming or a similar process. Alternatively, the edges may be left unsecured, achieving a generally "C" cross section.

The bumper bar 10 is typically secured to the vehicle by attaching it to a pair of side rails 14 of the vehicle frame (only one of which is shown in FIG. 1) by bolts 16 or other attachment means, at a pair of spaced points inwardly from the ends of the bumper bar 10. The forward side of the bumper system is covered by a plastic fascia 18 which forms the outer visible portion of the bumper system. This fascia is typically nonrectangular and its contour is determined by both aesthetic and aerodynamic considerations. The space between the rearward surface of the fascia and the forward surface of the bumper bar 10 may be filled with plastic foam 20. The foam may be formed integrally with the fascia, using a dual durometer system, or they may be separate components.

Figure 2:
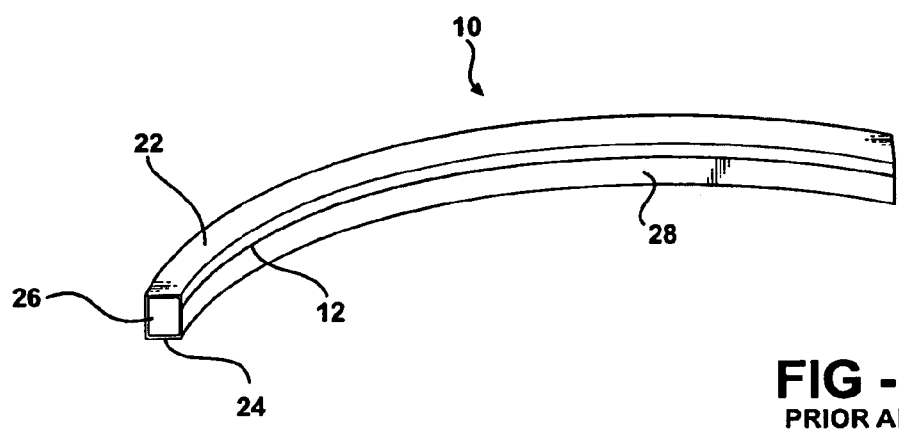
FIG. 2 is a perspective view of the bumper bar of FIG. 1 illustrating the sweep of the bar in the horizontal plane so that the ends are rearwardly of the center section.

The fascia has a sweep rearwardly from its center section toward its sides and the bumper bar generally indicated at 10, illustrated in perspective in FIG. 2, is similarly swept, either in the rolling process or preferably in a post-rolling pressing operation.

The bumper bars 10 of the prior art employ a variety of cross sections which may vary along the length of the bar and may include indentations, strengthening ribs and the like. Typical bumper bars for use in bumper systems of the type contemplated by this invention are disclosed, for example, in U.S. Pat. Nos. 5,080,410; 6,325,431; 6,343,820; 6,349,521 and 6,352,257. While each of these bars differs from one another in configuration, all generally employ the rectangular cross section, with a top 22, a bottom 24, a forward side 26, and a rearward side 28. The forward and rearward sides are aligned generally vertically, at right angles to the top and bottom. As a result, as illustrated in FIG. 1, the spacing between the fascia 18 and the forward surface 26 of the bumper bar will vary along its height and contour resulting in different thicknesses of foam 20 positioned between the two.

These bumper systems are driven by the need to absorb as much impact energy as possible in the shortest distance for purposes of minimizing bumper system package size and minimizing the mass so as not to adversely affect the vehicle's fuel consumption and emissions. The present invention is directed toward the goal of providing a bumper bar forward edge which closely approximates the contour of the fascia so as to minimize the distance between the two and the need for excessive use of foam or other material to fill the gaps between the bumper beam and the fascia.

The preferred embodiment of the bumper bar of the present invention is based on the bumper bar design disclosed in U.S. Pat. No. 6,352,297 to Sundgren et al. The disclosure of that patent is incorporated herein by reference. That bar is characterized by the fact that toward each end of the bar the rear flange surface, i.e. equivalent to 28 in FIGS. 1 and 2, is formed with a forward extending center section such that it contacts the forward flange, i.e. 26, at its midsection. The bar is formed with an array of grooves along its length and transversely to strengthen the bar and improve its collision properties. While incorporation of the improvements in the present invention with the Sundgren et al. bumper bar provides especially advantageous design, the present invention can be employed with any form of bumper bar system.

Figure 3:
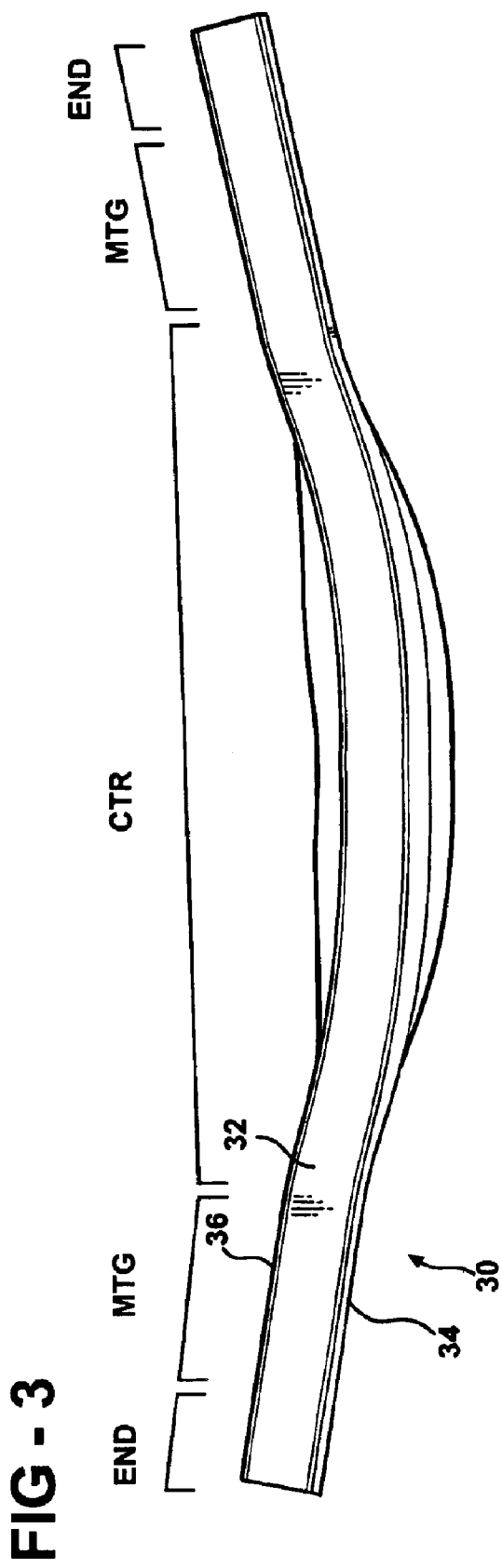
FIG. 3 is a top view of the bumper bar of the present invention.

A bumper bar formed in accordance with the present invention is illustrated in plan view in FIG. 3. The beam, generally indicated at 30, is elongated and has a top 32, a rear flange 34, a forward flange 36, and a bottom flange 38.

Figure 4:
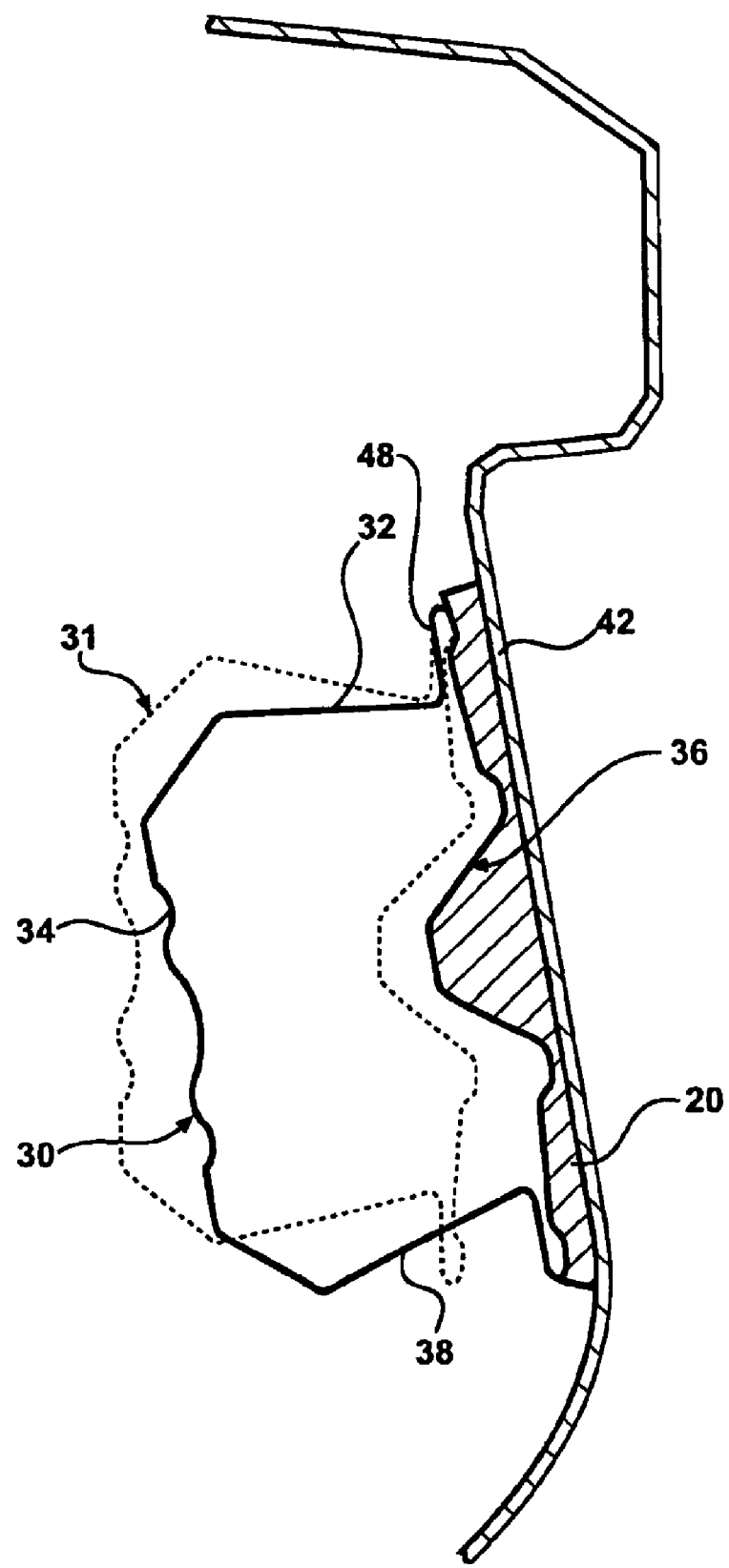
FIG. 4 is a cross section through the bar of FIG. 3 at the center section showing the contour of the fascia at that section and showing the untwisted position of the bumper bar in dotted line.
Figure 5:
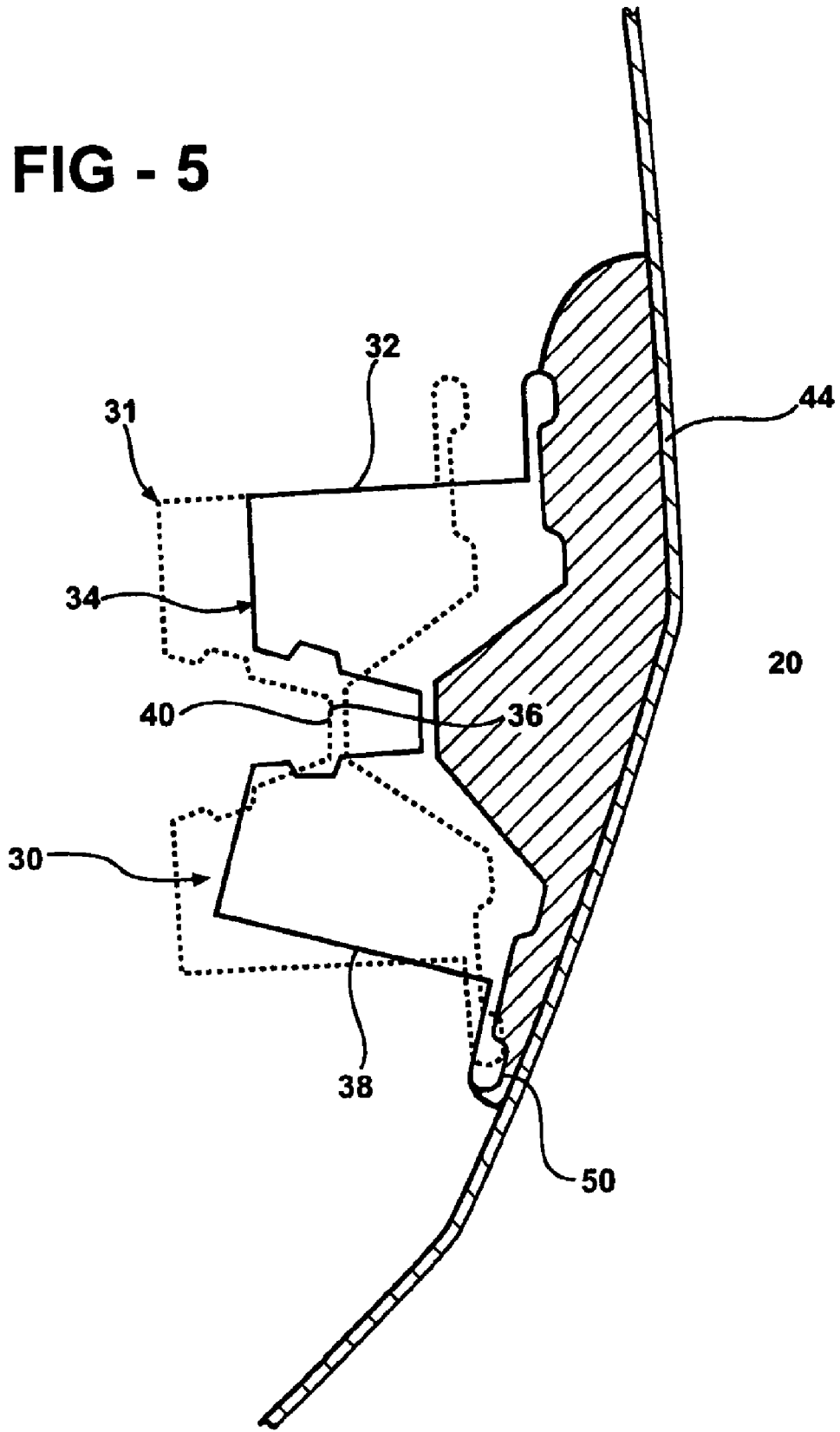
FIG. 5 is a cross section through the bumper bar of FIG. 3 adjacent the end of the bumper bar and showing the cross section of the fascia as it lies at that section showing the untwisted section of the bumper bar in dotted line.

As will be subsequently disclosed, the bumper bar is formed by a process which first involves rolling a sheet of steel into the desired cross-sectional configuration. The original cross sections of the material, before pressing, are illustrated in FIGS. 4 and 5 by the dotted lines of element 31. In this "untwisted" position it will be noted that the side flanges 34 and 36 are oriented generally vertically, normally to the end walls 32 and 38. While these untwisted cross sections include transversely oriented elements, and in particular the indentation 40 located in the rear flange 34 of the cross section, adjacent the corners of the vehicle, the untwisted sections, 31, resemble the prior art bumper bars. FIGS. 4 and 5 include the cross sections of the fascia at the centerline of the vehicle, as illustrated at 42 in FIG. 4 and on the corners of the vehicle as illustrated at 44 in FIG. 5 with the conventional foam 20 between the forward face of the bar and the rear face of the fascia. It is important to note that in its twisted position 30 the forward flange 36 of the bumper bar is substantially closer to the interior wall of the fascia 42 or 44 than it would be in the untwisted position of 31.

It should also be noted that in the preferred embodiment of the invention, the twist has been made about an axis which corresponds with one upper or lower edge of the twisted shape. In FIG. 4 the twisted contours and the untwisted contours substantially match at the forward top corner of the section indicated by the numeral 48. Similarly, at the corner cross section of FIG. 5, the twisted section 30 and the untwisted section 38 closely match at the numeral 50. These relatively untwisted points represent locations at which the cross section is locked during the twisting operation in the press as will be subsequently described.

Referring now to FIG. 6, a schematic illustration is shown of the method of processing the rolled bumper bar and includes a first step 52 by which the bar is roll formed the bar in a conventional manner, and such as in particular to achieve a box-shaped or C-shaped frame. Succeeding step 54 illustrates the welding of a longitudinal seam to join the edges in a closed shape, if necessary and desired.

Succeeding step 56 illustrates heating the bar above the transition temperature, preferably to its austenizing temperature. At step 58, the part is placed in a forming tool which twists the selected sections about the longitudinal axis of the bar and, at further step 60, bends the bar about the horizontal axis to provide it with the necessary sweep to accommodate the fascia, which often exhibits a rearward sweep away from the center. After the shaping, and preferably while in the same forming tool, the bumper beam is quenched at step 62.

Referring finally to FIG. 7, an illustration is generally shown of the manner in which a bar is twisted, such as along a center section thereof. In particular, and as shown, a part 64 is held between a pair of gripping members 66 and 68, such as compressible die members. A suitable torsional or twisting force may be applied, such as generally referenced at 70, and in order to twist such as a center section location of the bar. Reference is also made to the cross-sectional view of FIG. 4 and which shows the center twisted section position of a bar according to the invention.

Having described my invention, other and additional preferred embodiments will become apparent to those skilled in the art to which it pertains and without deviating from the scope of the appended claims.

I claim:

1. A bumper system for use with an automotive vehicle having a frame with opposed, forward extending side members, comprising:

a bumper bar formed of a section having a substantially vertical rear wall secured to the forward ends of the frame member to extend substantially transversely to the elongate axis of the side members;

a forward wall having vertical sections as well as sections twisted about the elongate axis of the bar; and a forward plastic fascia forming the forward surface of the vehicle, the fascia including sections inclined relative to the vertical so as to extend substantially parallel to forward sections of the bumper bar, and foam plastic extending between the forward surface of the bumper bar and the rear surface of the fascia.

2. The bumper system of claim 1 wherein said sections of the bumper bar which are twisted are twisted relative to the longitudinal axis of the bar to provide certain faces of the forward side of the bar which are inclined downwardly and forwardly.

3. The bumper system of claim 2 wherein the sections of the forward face of the bumper bar which are inclined forward and downwardly include the center section of the bar.

4. The bumper system of claim 2 wherein the sections of the forward face of the bumper bar which are inclined downwardly and forwardly include the two end sections of the bumper bar.

5. The bumper system of claim 1 wherein the bumper bar is originally formed as a closed box section having generally rectangular forward and rearward top and bottom surfaces.

6. The bumper system of claim 1 wherein the bumper bar is rolled as a "C" section and its free longitudinal edges are welded to form a closed box form.

* * * * *